United States Patent
Faurie et al.

(10) Patent No.: US 8,478,458 B2
(45) Date of Patent: Jul. 2, 2013

(54) METHOD AND DEVICE FOR ACTIVATING AN AUTOMATIC PILOTING MODE OF AN AIRCRAFT

(75) Inventors: Mathieu Faurie, Toulouse (FR); Jean Muller, Tournefeuille (FR)

(73) Assignee: Airbus Operations (SAS), Toulouse (FR)

( * ) Notice: Subject to any disclaimer, the term of this patent is extended or adjusted under 35 U.S.C. 154(b) by 234 days.

(21) Appl. No.: 12/785,173

(22) Filed: May 21, 2010

(65) Prior Publication Data
US 2010/0305785 A1 Dec. 2, 2010

(30) Foreign Application Priority Data
May 27, 2009 (FR) ...................................... 09 02548

(51) Int. Cl.
*G05D 1/00* (2006.01)

(52) U.S. Cl.
CPC .................................. *G05D 1/0061* (2013.01)
USPC .......... 701/11; 701/8; 701/9; 701/12; 701/16; 701/120; 340/979; 342/33

(58) Field of Classification Search
CPC ...................................................... G01C 5/005
USPC ....................................................... 701/9, 16
See application file for complete search history.

(56) References Cited

U.S. PATENT DOCUMENTS

| | | | | |
|---|---|---|---|---|
| 3,626,163 | A | * | 12/1971 | Dommasch ..................... 701/17 |
| 4,316,252 | A | * | 2/1982 | Cooper ........................... 701/16 |
| 5,170,163 | A | | 12/1992 | Collins et al. |
| 2004/0044446 | A1 | * | 3/2004 | Staggs ............................ 701/16 |
| 2005/0073440 | A1 | * | 4/2005 | Jourdan et al. ................ 340/961 |
| 2005/0192739 | A1 | * | 9/2005 | Conner et al. ................. 701/120 |
| 2006/0025898 | A1 | | 2/2006 | Charles |
| 2008/0269966 | A1 | * | 10/2008 | Markiton et al. ............... 701/16 |
| 2009/0048724 | A1 | | 2/2009 | Caule |
| 2009/0195413 | A1 | | 8/2009 | Constans |

FOREIGN PATENT DOCUMENTS

| | | |
|---|---|---|
| EP | 1684144 | 7/2006 |
| WO | WO 2007080313 A1 * | 7/2007 |

* cited by examiner

*Primary Examiner* — Ryan Zeender
*Assistant Examiner* — Hunter Wilder
(74) *Attorney, Agent, or Firm* — Novak Druce Connolly Bove + Quigg LLP

(57) ABSTRACT

A method and a device for activating an automatic piloting mode of an aircraft are disclosed. The device can include means for engaging an automatic pilot mode, when (i) the current distance of the aircraft with respect to a reference position on the ground belongs to a determined distance range, and (ii) the current height of the aircraft is at most equal to a reference height associated to the automatic pilot mode.

9 Claims, 2 Drawing Sheets

METHOD AND DEVICE FOR ACTIVATING AN AUTOMATIC PILOTING MODE OF AN AIRCRAFT

CROSS-REFERENCE TO RELATED APPLICATIONS

This application claims priority to French Patent Application 0902548, filed May 27, 2009, the contents of which are incorporated herein by reference.

FIELD OF THE INVENTION

The present invention relates to a method and a device for engagement of an automatic pilot mode of an aircraft comprising an automatic pilot, during landing on a runway. This invention also relates to an aircraft provided with such a device.

BACKGROUND OF THE INVENTION

For an aircraft provided with an automatic pilot, for instance, a civil transport airplane, it is known that, during the approach stage during a landing operation controlled by the automatic pilot, a large number of guiding laws are implemented, within the automatic pilot itself. Such guiding laws make it possible to bring the aircraft up to the runway threshold and to implement the flared landing, the alignment, the nose drop and then the deceleration on the runway. To each guiding law, there is associated a particular automatic pilot mode, so that the engagement of the automatic pilot modes results in the corresponding guiding laws being activated. The good occurrence of a landing operation as controlled by the automatic pilot thus depends on the consistent sequencing and behavior of the different pilot modes.

It is moreover known that, during such an automatic approach phase (i.e. controlled by the automatic pilot), engaging the pilot modes by the automatic pilot depends, more particularly, on the current height of the aircraft with respect to the ground.

However, the current height of the aircraft is mainly determined by radio altimeters (generally two or three, on board the aircraft and connected to the automatic pilot thereof), being sensitive to external disturbances (for instance, clouds, rain, etc.). They could thus provide wrong data, likely to be misinterpreted by the automatic pilot and to disturb the engagement of the automatic pilot modes.

Now, an untimely engagement (or a lack of engagement) of an automatic pilot mode could result in an untimely activation (or a lack of activation) of a guiding law, leading to the aircraft being guided inappropriately.

For overcoming such drawbacks, it is known to check the consistency of the heights as provided by radio altimeters of the aircraft and, when they are inconsistent therebetween, to trigger an alarm in the cockpit so as to warn the crew a problem has occurred and that it should be preferred to interrupt the automatic approach. Such a monitoring generally carried out by the automatic pilot, is based on the fact that it is unlikely that the various altimeters of an aircraft should simultaneously emit, at a given moment, wrong data, but being consistent one relative to the other.

However, frequently, a warning is emitted and the automatic approach is interrupted even when the height being read by one of the radio altimeters is right, amongst the received inconsistent heights.

Moreover, in the case where only one of the radio altimeters is operating, comparing the heights provided by the different radio altimeters is not more feasible, so that, as a precaution measure, a warning is emitted and the automatic approach interrupted, although the height provided by the radio altimeter in operation could be right.

SUMMARY OF THE INVENTION

The present invention aims at overcoming such drawbacks.

To this end, according to this invention, the method for engaging, upon landing, an automatic pilot mode of an aircraft comprising an automatic pilot, able to control the trajectory of said aircraft, and at least one altimeter, able to determine the current height of said aircraft, is remarkable in that it comprises the following steps:

A/ the current distance separating said aircraft from a reference position on the ground is measured;

B/ from a reference height associated to said automatic pilot mode and the current loss of said trajectory, a range of distance is determined, with respect to said reference position, for engaging said mode;

C/ it is checked whether said current distance belongs to said determined engagement range;

D/ it is checked whether said current height is at the most equal to said reference height; and E/ when said current distance belongs to said determined range and said current height is at the most equal to said reference height, said automatic pilot mode is engaged.

Thus, according to this invention, a range of distances is determined wherein it is expected the aircraft to have a height at the most equal to a reference height, depending on the automatic pilot mode to be considered. When the aircraft comprises several altimeters of the same type, for instance, radio altimeters, a given automatic pilot mode could be engaged when the heights as provided by the radio altimeters are inconsistent therebetween. Indeed, it is possible to detect, amongst the inconsistent heights as provided by radio altimeters, the height(s) being compatible with the current distance separating the aircraft from the reference position and to engage the corresponding automatic pilot mode. Moreover, the emission of a warning is avoided, being likely to disturb the pilots.

In addition, when one single radio altimeter of the aircraft is operating (the other being, for instance, defective), an automatic pilot mode could be engaged when the height of the operating radio altimeter is compatible with the current distance separating the aircraft from the reference position.

In an embodiment according to this invention, there is defined, advantageously, a minimum slope and a maximum slope, surrounding said current slope, and the minimum border and the maximum border of said engagement range is determined from respectively formulae $$\frac{H_{réf}}{\tan\gamma_{max}} \text{ and } \frac{H_{réf}}{\tan\gamma_{min}},$$

wherein:

$H_{réf}$ represents said reference height; and $\gamma_{min}$ and $\gamma_{max}$ respectively correspond to said minimum slope and to said maximum slope.

In another embodiment of the invention, there is advantageously defined a margin as a function of said reference height and of said current slope and there is determined the minimum border and the maximum border of said engagement range from respectively formulae $$\frac{H_{réf}}{\tan\gamma} - M(H_{réf}, \gamma) \text{ and } \frac{H_{réf}}{\tan\gamma} + M(H_{réf}, \gamma),$$

wherein:
- $H_{réf}$ represents said reference height;
- γ corresponds to said current slope and
- $M(H_{réf},\gamma)$ represents said margin.

Preferably, said current distance separating said aircraft from said reference position corresponds to the distance between the orthogonal projection of said aircraft on the horizontal plane crossing said reference position and the latter.

Moreover, said reference position to the ground could correspond to the runway threshold.

Additionally, in step A, estimating said current distance advantageously occurs from geographical data, of the GPS type (Global Positioning System), being independent from data from the altimeter(s) of the aircraft.

In addition, in the case where, said aircraft comprises inertial units, said current slope could be determined from said inertial units, when said aircraft is stabilized.

Alternatively or in addition, said current slope could be determined from:
- either a data base on board said aircraft;
- or data from ground facilities, received by said aircraft.

Advantageously, a warning is emitted to the crew of said aircraft when at least one of the following flight situations is met:
- said current distance does not belong to said determined engagement range, whereas said current height is at the most equal to said reference height;
- said current distance belongs to said determined engagement range, whereas said current height is strictly higher than said reference height.

Moreover, the present invention also relates to a device for engaging, upon landing, an automatic pilot mode of an aircraft comprising an automatic pilot, able to control the trajectory of said aircraft, and at least one altimeter, able to determine the current height of said aircraft.

According to this invention, the device is remarkable in that it comprises:
- means for estimating the current distance separating said aircraft from a reference position on the ground;
- means for determining, from a reference height associated to said automatic pilot mode and the current slope of said trajectory, a range of distances, with respect to said reference position, for engaging said mode;
- means for checking that said current distance belongs to said determined engagement range;
- means for checking that said current height is at the most equal to said reference height; and
- means for engaging said automatic pilot mode, able to be modified when said current distance belongs to said determined range and that said current height is at the most equal to said reference height.

The present invention also relates to an aircraft comprising a device such as mentioned hereinabove.

BRIEF DESCRIPTION OF THE DRAWINGS

The figures of the appended drawing will make it easier to understand how the present invention could be implemented. On these figures, identical references indicate similar elements.

DETAILED DESCRIPTION

Figure 1:
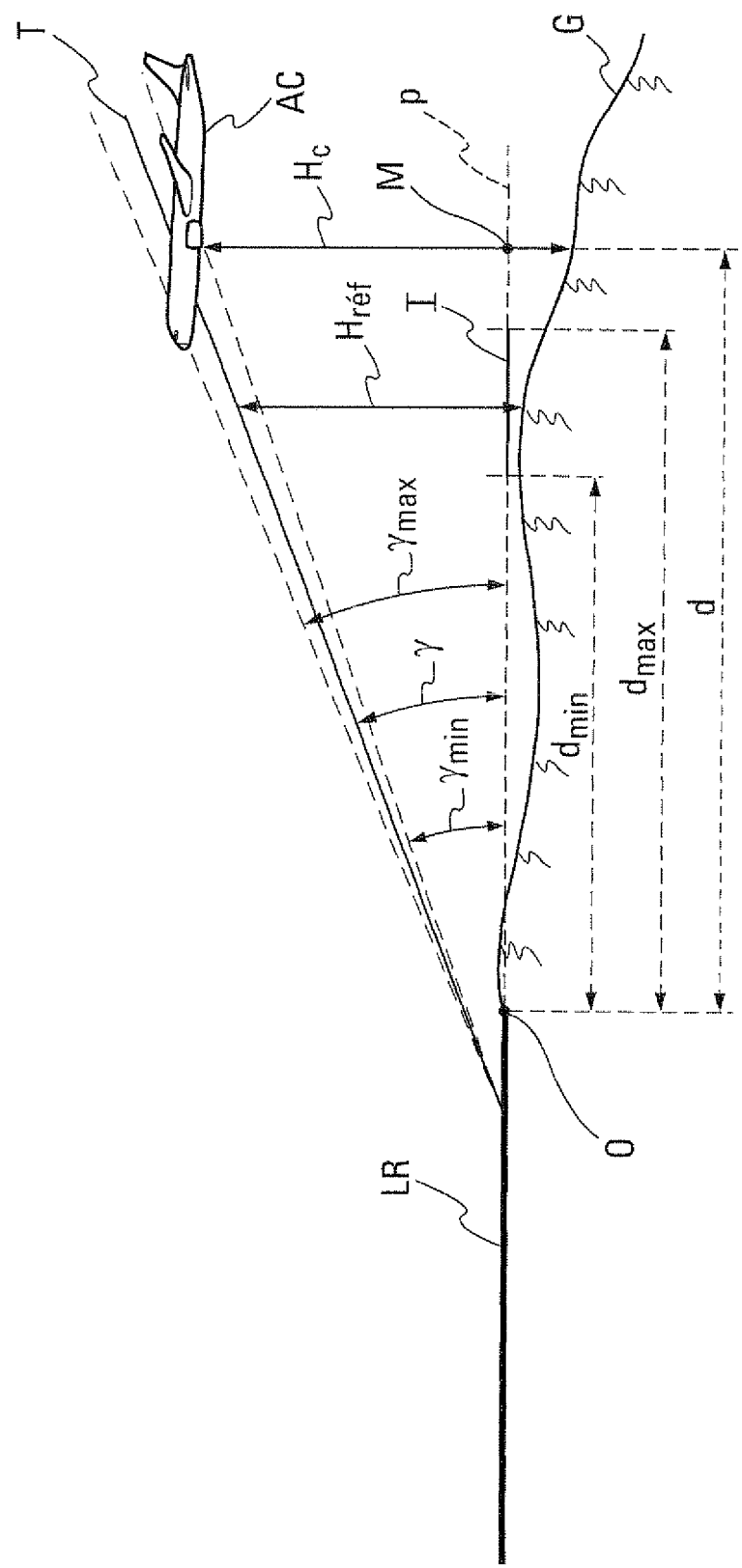
FIG. 1 schematically shows an airplane during an automatic approach phase, upon a landing on a runway, according to the present invention.

On FIG. 1, an aircraft AC has been represented (for instance, a civil transport airplane) provided with an automatic pilot (not shown), during an automatic approach phase on a landing runway LR, the runway threshold being marked by O.

The automatic pilot of the airplane AC controls, at least partially, the automatic approach, successively engaging different automatic pilot modes.

Currently, each automatic pilot mode is associated to a guiding law being applied by the automatic pilot, when the mode is engaged.

The airplane AC additionally comprises several radio altimeters 1 (for instance, three), able to each provide the current height $H_c$ of the airplane AC with respect to the ground G, inertial units 2 and satellite positioning means 3 of the GPS type.

Figure 2:
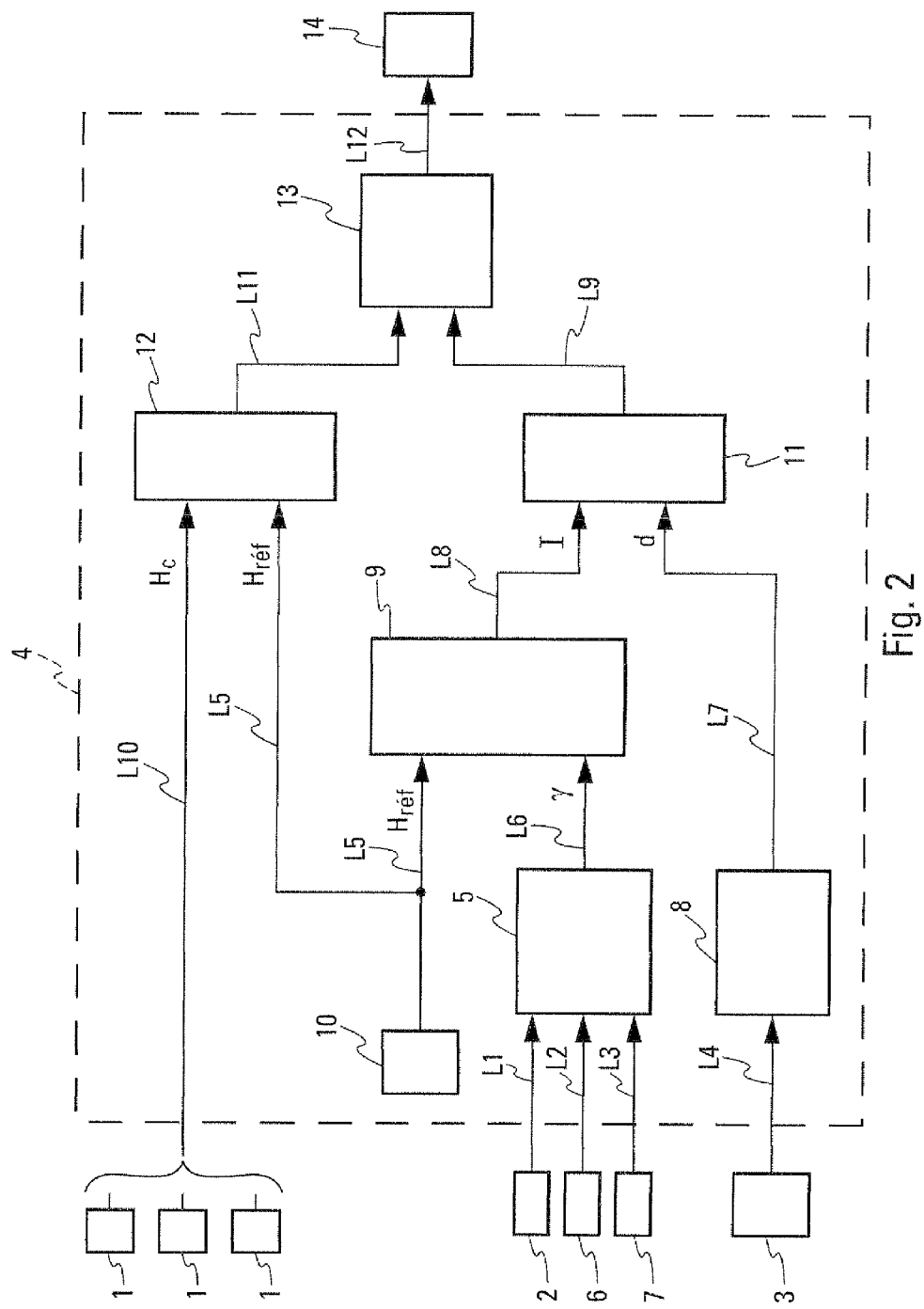
FIG. 2 represents, as a block diagram, a device according to the present invention, allowing automatic pilot modes to be engaged by the automatic pilot of the airplane of FIG. 1, upon a landing.

According to this invention, the airplane AC also comprises a device 4, according to this invention and schematically represented on FIG. 2, being intended to command the engagement of different automatic pilot modes upon an automatic approach.

As shown on FIG. 2, the engagement device 4 comprises:
- means 5 for determining the current slope γ associated to the trajectory T followed by the airplane AC. The determining means 5 are able to receive, in entry, information transmitted by the on-board inertial units 2, information on the current slope γ of the trajectory T of the airplane AC coming from a data base on board the airplane AC (for instance, stored in storing means 6), as well as information on the current slope γ of the trajectory T from facilities on the ground and received by receptors 7 arranged on board the airplane AC, via respectively, links L1, L2 and L3. When they receive, respectively via links L2 and L3, slope information coming either from the storing means 6 or the on-board receptors 7, the delivery means 5 deliver, in outlet, a signal representative of the current slope γ. On the contrary, when no information on the current slope reaches the determining means 5 through links L2 and L3, the latter are able to determine the current slope γ from information from inertial units 2 of the airplane AC, and to deliver, in outlet, a signal representative of the current slope γ;
- means 8 for estimating the current distance separating the orthogonal projection M of the airplane AC on the horizontal plane P crossing the runway threshold O and the latter. Estimating means 8 could receive, in entry, geographical information of the airplane AC provided by GPS positioning means 3, via the link L4. From these positioning information, estimating means 8 are able to deliver, in outlet, a signal representative of the current distance separating the airplane C from the runway threshold O; and
- means 9 for determining, for each automatic pilot mode, a range of distances I with respect to the runway threshold O for engaging the automatic pilot mode to be considered. The engagement range I, associated to a given automatic pilot mode, is defined by a minimum border $d_{min}$ (corresponding to the closest distance to the runway threshold O) and a maximum border $d_{max}$ (corresponding to the most remote distance from the runway threshold O). Determining means 9 are able to receive, in entry, a reference height $H_{réf}$ associated to each of the automatic pilot modes (the reference heights $H_{réf}$ be stored in a memory 10 belonging, for instance, to the device 4, although it could happen differently), as well as the signal representative of the current slope γ of the trajectory T of the airplane AC, via, respectively, links L5 and L6. From this data, the determining means 9 could deliver, in outlet, a signal representative of the determined engagement range associated to each of the automatic pilot modes.

According to an embodiment according to this invention, means 9 for determining engagement ranges are able to define a minimum slope $\gamma_{min}$ and a maximum slope $\gamma_{max}$, surrounding the current slope γ received from means 5, so as to determine, for each automatic pilot mode, the minimum border $d_{min}$ and the maxi-mum border $d_{max}$ of an engagement range I being associated, respectively from formulae $$\frac{H_{réf}}{\tan\gamma_{max}} \text{ and } \frac{H_{réf}}{\tan\gamma_{min}},$$

$H_{réf}$ representing the reference height of the automatic pilot mode to be considered.

In another embodiment according to this invention, for each automatic pilot mode, determining means 9 are able to define a margin $M(H_{réf},\gamma)$ as a function of the reference height $H_{réf}$ of each pilot mode, and of the current slope γ of the trajectory T, in order to determine, for each automatic pilot mode, the minimum border $d_{min}$ and the maximum border $d_{max}$ of an associated engagement range I, respectively from following formulae $$\frac{H_{réf}}{\tan\gamma} - M(H_{réf}, \gamma) \text{ and } \frac{H_{réf}}{\tan\gamma} + M(H_{réf}, \gamma).$$

Alternatively, determining means 9 could determine, for each automatic pilot mode, the minimum border and the maximum border of an associated engagement range respectively from formulae $$\frac{H_{réf}}{\tan\gamma_{max}} - M(H_{réf}, \gamma) \text{ and } \frac{H_{réf}}{\tan\gamma_{min}} + M(H_{réf}, \gamma).$$

Additionally, the engagement device 4 of FIG. 2 further comprises:
means 11 for checking that the current distance, received from the estimating means 8 through the link L7, belongs to the determined engagement range I, associated to a given automatic pilot mode and received from the determining means 9 via the link L8. Checking means 11 are able to deliver, in outlet through the link L9, a signal representative of the fact that the current distance belongs to the determined range I. In the opposite case (the current distance does not belong to the determined range I), no signal is emitted in outlet of the checking means 11;
means 12 for checking that, for each automatic pilot mode, the current height $H_c$ of the airplane AC comes from at least one of the radio altimeters 1 is at the most equal to the reference height $H_{réf}$ of the corresponding automatic pilot mode. Checking means 12 receive the current height $H_c$ by the on-board radio altimeters 1, via the link L10. They are able to emit, in outlet via the link L11, a signal representative of the fact that the current height $H_c$ of at least one of the radio altimeters is at the most equal to the reference height $H_{réf}$ of the pilot mode to be considered. In the opposite case (the current height $H_c$ of all the on-board radio altimeters 1 is strictly higher than the reference height $H_{réf}$), no signal is delivered in outlet of the checking means 11; and
means 13 for engaging automatic pilot modes, being connected to the checking means 11 and to the checking means 12, via respectively links L9 and L11. Thus, for a given automatic pilot mode, the engaging means 13 are able to launch the engagement of said pilot mode, when they receive simultaneously the signal representative of the fact that the current distance belongs to the determined range I and the signal representative of the fact that the current height $H_c$ of at least one the radio altimeters 1 is at the most equal to the reference height $H_{réf}$ of the pilot mode to be considered, via, respectively links L9 and L11.

Moreover, the engagement means 13 for the device 4 of the invention are further able to deliver, in outlet, via the link L12, a signal for activating a warning intended for warning means 14 on board the airplane AC. Such an activation signal is emitted when at least one of the following conditions is met:
the current distance d does not belong to the engagement range I as determined for a given automatic pilot mode, whereas the current height $H_c$ of the airplane AC of at least one of the radio altimeters 1 is at the most equal to the reference height $H_{réf}$ associated to this mode;
the current distance d belongs to the determined engagement range I of the automatic pilot mode to be considered, but the current height $H_c$ of all the radio altimeters 1 of the airplane AC is strictly higher than the reference height $H_{réf}$ associated to the mode.

The warning means 14 are able to emit a sound warning and/or a visual warning for informing the crew about one of the two above mentioned flight situations.

It is to be noticed that the engagement device 4 could be entirely integrated into the automatic pilot of the airplane AC. Obviously, alternatively, it could be contemplated that only some means of the engagement means 4 are integrated into the automatic pilot, or even, that the engagement device 4 is completely outside the automatic pilot while being connected to the latter.

The invention claimed is:

1. A method for automatically engaging, upon a landing, an automatic pilot mode of an aircraft (AC) comprising an automatic pilot, able to control the trajectory (T) of said aircraft (AC), and at least an altimeter (1), able to determine the current height ($H_c$) of said aircraft (AC), said method comprising:
A/ estimating the current distance (d) separating said aircraft (AC) from a reference position on the ground (O);
B/ determining from a reference height ($H_{réf}$) associated to said automatic pilot mode and the current slope (γ) of said trajectory (T), a range of distances (I) with respect to said reference position (O), for automatically engaging said mode;
C/ checking whether said current distance (d) belongs to said determined engagement range (I);
D/ checking whether said current height ($H_c$) is at the most equal to said reference height ($H_{réf}$); and E/ when said current distance (d) belongs to said determined engagement range (I) and said current height ($H_c$) is at the most equal to said reference height ($H_{réf}$), automatically engaging said automatic pilot mode, wherein a minimum slope ($\gamma_{min}$) and a maximum slope ($\gamma_{max}$) are defined, surrounding said current slope ($\gamma$); and a minimum border ($d_{min}$) and a maximum border ($d_{max}$) of said engagement range (I) are determined respectively from formulae $$\frac{H_{réf}}{\tan\gamma_{max}} \text{ and } \frac{H_{réf}}{\tan\gamma_{min}},$$

wherein:
$H_{réf}$ represents said reference height; and
$\gamma_{min}$ and $\gamma_{max}$ respectively correspond to said minimum slope and to said maximum slope.

2. A method according to claim 1, wherein said current distance (d) separating said aircraft (AC) from said reference position (O) corresponds to the distance between an orthogonal projection (M) of said aircraft (AC) on a horizontal plane (P) crossed by said reference position (O) and the latter.

3. A method according to claim 1, wherein, in step A, estimating said current distance (d) is made from geographical data, of a GPS type.

4. A method according to claim 1, said aircraft (AC) comprising inertial units (2), wherein, when said aircraft (AC) is stabilized, said current slope ($\gamma$) is determined from said inertial units (2).

5. A method according to claim 1, wherein said current slope ($\gamma$) is determined from:
either a data base on board said aircraft (AC);
or data from ground facilities, received by said aircraft (AC).

6. A method according to claim 1, wherein a warning is emitted to the crew of said aircraft (AC) when at least one of the following flight situations is checked:
said current distance (d) does not belong to said determined engagement range (I), whereas said current height ($H_c$) is at the most equal to said reference height ($H_{réf}$);
said current distance (d) belongs to said determined engagement range whereas said current height ($H_c$) is strictly higher than said reference height ($H_{réf}$).

7. A method for automatically engaging, upon a landing, an automatic pilot mode of an aircraft (AC) comprising an automatic pilot, able to control the trajectory (T) of said aircraft (AC), and at least an altimeter (1), able to determine the current height ($H_c$) of said aircraft (AC) said method comprising:

A/ estimating the current distance (d) separating said aircraft (AC) from a reference position on the ground (O);

B/ determining from a reference height ($H_{réf}$) associated to said automatic pilot mode and the current slope ($\gamma$) of said trajectory (T), a range of distances (I) with respect to said reference position (O), for automatically engaging said mode;

C/ checking whether said current distance (d) belongs to said determined engagement range (I);

D/ checking whether said current height ($H_c$) is at the most equal to said reference height ($H_{réf}$); and E/ when said current distance (d) belongs to said determined engagement range (I) and said current height ($H_c$) is at the most equal to said reference height ($H_{réf}$), automatically engaging said automatic pilot mode, wherein a margin ($M(H_{réf}, \gamma)$) is defined as a function of said reference height ($H_{réf}$) and of said current slope ($\gamma$); and a minimum border ($d_{min}$) and a maximum border ($d_{max}$) of said engagement range (I) are determined respectively from formulae $$\frac{H_{réf}}{\tan\gamma} - M(H_{réf}, \gamma) \text{ and } \frac{H_{réf}}{\tan\gamma} + M(H_{réf}, \gamma),$$

wherein:
$H_{réf}$ represents said reference height;
$\gamma$ corresponds to said current slope; and
$M(H_{réf}, \gamma)$ represents said margin.

8. A device for automatically engaging, upon a landing, an automatic pilot mode of an aircraft (AC) comprising: an automatic pilot, able to control the trajectory (T) of said aircraft (AC), and at least one altimeter (1), able to determine the current height ($H_c$) of said aircraft (AC), said device comprising:

means (8) for estimating the current distance (d) separating said aircraft (AC) from a reference position on the ground (O);

means (9) for determining, from a reference height ($H_{réf}$) associated to said automatic pilot mode and a current slope ($\gamma$) of said trajectory (T), a range of distances (I), with respect to said reference position (O), for automatically engaging said mode;

means (11) for checking that said current distance (d) belongs to said determined engagement range (I);

means (12) for checking that said current height ($H_c$) is at the most equal to said reference height ($H_{réf}$); and means (13) for automatically initiating said automatic pilot mode, able to be activated when said current distance (d) belongs to said determined engagement range (I) and that said current height ($H_c$) is at the most equal to said reference height ($H_{réf}$)

wherein a minimum slope ($\gamma_{min}$) maximum slope ($\gamma_{max}$) are defined, surrounding said current slope ($\gamma$); and a minimum border ($d_{min}$) and a maximum border ($d_{max}$) of said engagement range (I) are determined respectively from formulae $$\frac{H_{réf}}{\tan\gamma_{max}} \text{ and } \frac{H_{réf}}{\tan\gamma_{min}},$$

wherein:
$H_{réf}$ represents said reference height; and
$\gamma_{min}$ and $\gamma_{max}$ respectively correspond to said minimum sloe and to said maximum slope.

9. An aircraft (AC), comprising an automatic pilot, able to control the trajectory (T) of said aircraft (AC), and at least one altimeter (1), able to determine the current height (H) of said aircraft (AC), including the device for automatically engaging, upon a landing, an automatic pilot mode of the aircraft as specified in claim 8.

* * * * *